(12) United States Patent
Fiene

(10) Patent No.: US 6,814,462 B1
(45) Date of Patent: Nov. 9, 2004

(54) UNDER-CABINET LIGHTING SYSTEM

(75) Inventor: Dale E Fiene, Algonquin, IL (US)

(73) Assignee: Ole K. Nilssen, Bonita Springs, FL (US)

( * ) Notice: Subject to any disclaimer, the term of this patent is extended or adjusted under 35 U.S.C. 154(b) by 229 days.

(21) Appl. No.: 09/650,496

(22) Filed: Aug. 29, 2000

(51) Int. Cl.[7] .......................... A47B 23/06; A47B 97/00; F21V 33/00
(52) U.S. Cl. ........................ 362/133; 362/147; 362/148; 362/152; 362/227; 362/235; 362/225; 362/221; 362/216; 362/219; 362/260; 362/226; 362/391
(58) Field of Search .............................. 439/419, 414, 439/404, 417; 362/133, 147, 148, 152, 227, 235, 225, 221, 216, 219, 260, 226, 391

(56) References Cited

U.S. PATENT DOCUMENTS

| | | | | |
|---|---|---|---|---|
| 729,303 | A | * 5/1903 | Erikson | 362/277 |
| 3,609,643 | A | * 9/1971 | Connan | 439/419 |
| 4,626,747 | A | 12/1986 | Nilssen | 315/209 R |
| 4,631,648 | A | * 12/1986 | Nilssen | 362/150 |
| 4,651,059 | A | 3/1987 | Nilssen | 315/182 |
| 4,667,133 | A | 5/1987 | Nilssen | 315/312 |
| 4,890,039 | A | 12/1989 | Nilssen | 315/119 |
| 4,972,126 | A | 11/1990 | Nilssen | 315/324 |
| 5,003,227 | A | 3/1991 | Nilssen | 315/161 |
| 5,047,696 | A | 9/1991 | Nilssen | 315/312 |
| 5,221,139 | A | * 6/1993 | Belfer | 362/225 |
| 5,262,700 | A | 11/1993 | Nilssen | 315/223 |
| 5,276,597 | A | * 1/1994 | Herst et al. | 362/296 |
| 5,343,124 | A | 8/1994 | Nilssen | 315/224 |
| 5,371,441 | A | 12/1994 | Nilssen | 315/209 R |
| 5,426,347 | A | 6/1995 | Nilssen | 315/209 R |
| 5,471,375 | A | * 11/1995 | Lau | 363/260 |
| 5,479,326 | A | 12/1995 | Nilssen | 362/148 |
| 5,485,057 | A | * 1/1996 | Smallwood et al. | 315/58 |
| 5,559,393 | A | 9/1996 | Nilssen | 315/58 |
| 5,640,069 | A | 6/1997 | Nilssen | 315/209 R |
| 5,691,603 | A | 11/1997 | Nilssen | 315/209 R |
| 5,751,117 | A | * 5/1998 | Abbott | 315/244 |
| 5,796,210 | A | * 8/1998 | Sakakibara et al. | 313/493 |
| 5,998,936 | A | 12/1999 | Nilssen | 315/209 R |
| 6,083,021 | A | * 7/2000 | Lau | 439/227 |
| 6,198,228 | B1 | * 3/2001 | Nilssen | 315/185 R |
| 6,217,190 | B1 | * 4/2001 | Altman et al. | 362/221 |
| 6,390,652 | B1 | * 5/2002 | Echito | 362/374 |

* cited by examiner

Primary Examiner—Sandra O'Shea
Assistant Examiner—Sharon Payne

(57) ABSTRACT

A low cost under-cabinet and display case lighting system that permits the highest degree of flexibility in the installation and location of luminaires for under-cabinet and display case lighting. The system consists of a high-frequency power source, an interconnection cord, and one or more high-frequency luminaires. The high-frequency power source is powered from a source of 50 or 60 Hertz power. The interconnection cord is connected to the high-frequency output of high-frequency power source. The high-frequency luminaires are mounted in the desired locations under the cabinets or display case shelves. The interconnecting cord is then routed to each of the high-frequency luminaires and placed over the input terminals. The protective cover is then forced over the interconnecting cord in the area of the input terminals forcing the input terminals to pierce and displace the insulation of the cord and make contact with the conductors within the interconnecting cord. Any number of additional high-frequency luminaires (within the capacity of the high-frequency power source) may be added in the same manner.

19 Claims, 5 Drawing Sheets

UNDER-CABINET LIGHTING SYSTEM

BACKGROUND

1. Field of Invention

This invention relates to gas discharge lamp luminaires in general, and to gas discharge lamp luminaires for under-cabinet type lighting in particular.

2. Description of Prior Art

Current fluorescent luminaires for under-cabinet applications typically consist of a plastic or metal enclosure which contain a fluorescent lamp ballast, wiring to lampholders, lampholders, one or more fluorescent lamps, and a lens. The fluorescent lamp ballast, wiring to lampholders and the back part of the lampholders are contained in one compartment of the enclosure. This part of the enclosure also contains the connection of the wiring from the 60-Hertz power source to the input of the fluorescent lamp ballast. A less common arrangement is to place the 60-Hertz fluorescent lamp ballast in a "remote ballast enclosure" and connect the "remote ballast enclosure" to the balance of the luminaire by way of a BX cable. In both cases, the size of the enclosure is substantial compared to the size of the fluorescent lamps themselves. This is because the fluorescent lamp ballast is powered from a 60-Hertz source, which results in a physically large package. Using an electronic ballast generally contributes to a significant weight reduction, assuming the ballast is not potted with asphalt, but the physical size is usually not dramatically reduced. The connection from the 60 Hertz source to the fluorescent lamp ballast has to be made in an enclosure that meets specific requirements dictated by Underwriters Laboratories' STANDARD FOR FLUORESCENT LIGHTING FIXTURES (UL1570); therefore, the enclosure is much larger, heavier and more expensive than it might otherwise need to be. Nilssen discloses the use of high-frequency power limited voltage to power fluorescent lamps in a number of his patents. In FIG. 14 of U.S. Pat. No. 5,640,069; Nilssen discloses an under-cabinet lighting system where a number of lamp structures are plugged into one another by connecting the male-type input port of one lamp structure into the female-type output port of the preceding lamp structure. As shown in FIG. 14 of the Nilssen patent, this is accomplished by plugging the male-type-input port directly into the female-type output port. This approach works well for designs that use linear lamps and where a continuous line of light is desired. This approach does not work at all for single-ended lamps. That same figure also shows an alternate approach, which is implemented by making this connection with a short interconnecting cord. Although adding some flexibility when used in combination with the previous approach it requires that a wide selection of lengths of previously manufactured interconnecting cords be stocked and available or that the various lengths of cords need to be made up at the time of installation. If the interconnecting cords are used under a wall cabinet, a relatively large hole needs to be drilled between the lower portion of the adjacent sides of the wall cabinets to accommodate the connectors on the interconnecting cords, which are significantly larger than the cord itself

OBJECTS AND ADVANTAGES

Accordingly, several objects and advantages of my invention are a simpler and more flexible system for installing and connecting under-cabinet type lighting plus a self-contained one-piece ballasted-socket assembly for single-ended lamps that can be mounted directly beneath a cabinet or a shelf. The unit is much lighter and more compact than existing under-cabinet fixtures currently available and it allows for a number of luminaires to be connected along the same high-frequency power cord without the need for providing separate male and female connectors on the power cord or in the luminaires.

Still further objects and advantages will become apparent from a consideration of the ensuing description and accompanying drawings.

BRIEF DESCRIPTION OF THE DRAWINGS

FIG. 4 shows a ballasted-socket assembly applied to a single long Biax lamp;

Figure 1:
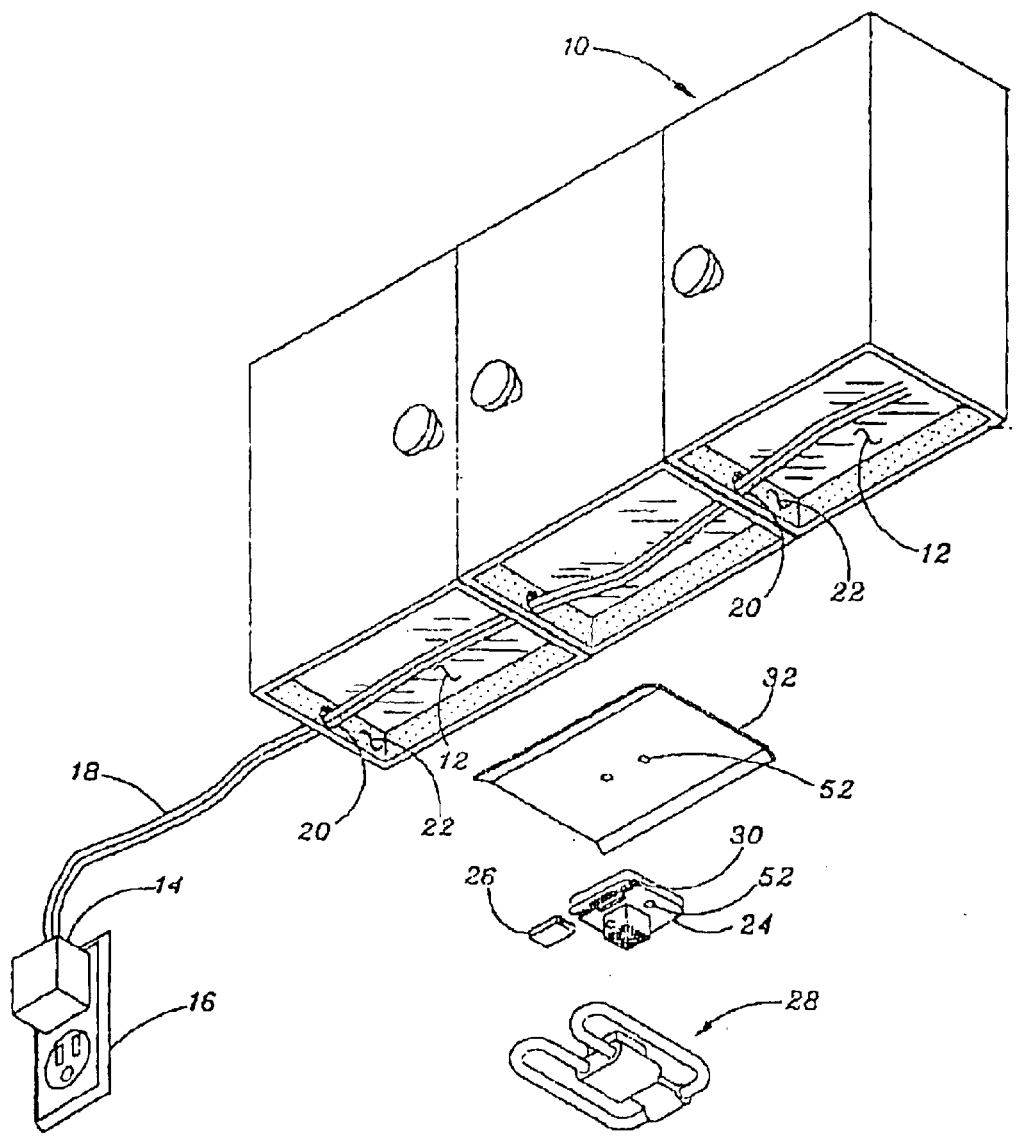
FIG. 1 shows a view of the underside of a kitchen wall cabinet and the basic components of the under-cabinet lighting system.

Reference Numerals 1 10 wall cabinet
2 12 wall cabinet bottom
3 14 high-frequency power supply
4 16 duplex wall outlet
5 18 high-frequency output cord
6 20 access hole
7 22 cabinet side panels
8 24 high-frequency ballasted-socket assembly
9 26 slide-on cover
10 28 2D lamp
11 30 recessed channel
12 32 reflector
13 34 high-frequency input terminal #1
14 36 high-frequency input terminal #2
15 38 base
16 40 base tabs
17 42 column
18 44 four-pin lamp socket
19 46 lamp plug assembly
20 48 cover tabs
21 50 center ridge
22 52 screw holes
23 54 two lamp high-frequency ballasted-socket assembly
24 56 recessed channel A
25 58 recessed channel B
26 60 base cover plate
27 62 double Biax lamp
28 64 mounting base
29 66 ballast housing
30 68 Biax lamp ballasted-socket assembly
31 70 long Biax lamp
32 72 Biax lamp socket
33 74 support bracket
34 76 recess
35 78 transformer
36 80 cathode windings
37 82 ballasting capacitor
38 84 power level jack 39 86 power level plug
40 87 gas discharge lamp
41 88 output terminals
42 89 cathode
43 90 power increasing capacitor
44 91 cathode terminal
45 92 tank capacitor
46 94 tank inductor
47 96 starting aid capacitor
48 98 supplemental ballasting capacitor
49 100 three-terminal socket
50 102 power level jumper

SUMMARY

This invention is directed to a design of an under-cabinet type lighting system. The system is comprised of a high-frequency power source, an interconnecting power cord, and one or more self-contained one-piece ballasted-socket assemblies for single-ended lamps. The high-frequency power source is connected to a 50 or 60 Hertz power line. An interconnecting power cord is connected to the output of the high-frequency power source and routed beneath the cabinets or shelves. In one embodiment, the ballasted-socket assemblies are then mounted directly beneath the cabinets or shelves. The interconnecting power cord is then placed into a recessed channel built into the ballasted-socket luminaire and a cover is slid over the channel forcing the cord down and into a pair of input terminals that make electrical contact with the conductors within the interconnecting cord. A number of additional ballasted-socket assemblies can be added at any point along the length of the interconnecting power cord up to the maximum power rating of the high-frequency power source.

DESCRIPTION

Preferred Embodiment

FIG. 1 shows a view of the underside of a kitchen wall cabinet 10. As shown in the drawing the front, sides, and back of the cabinet actually extend 1.5 to 2 inches below the wall cabinet bottom 12. A high-frequency power supply 14 is shown plugged into a duplex wall outlet 16. A high-frequency output cord 18 extends from the high-frequency power supply 14 through access holes 20 that are drilled through the cabinet side panels 22. Beneath the cabinet is shown high-frequency ballasted-socket assembly 24 with slide-on cover 26 and 2D lamp 28. An optional reflector 32 can be installed between the wall cabinet bottom 12 and the high-frequency ballasted-socket assembly 24.

Figure 2:
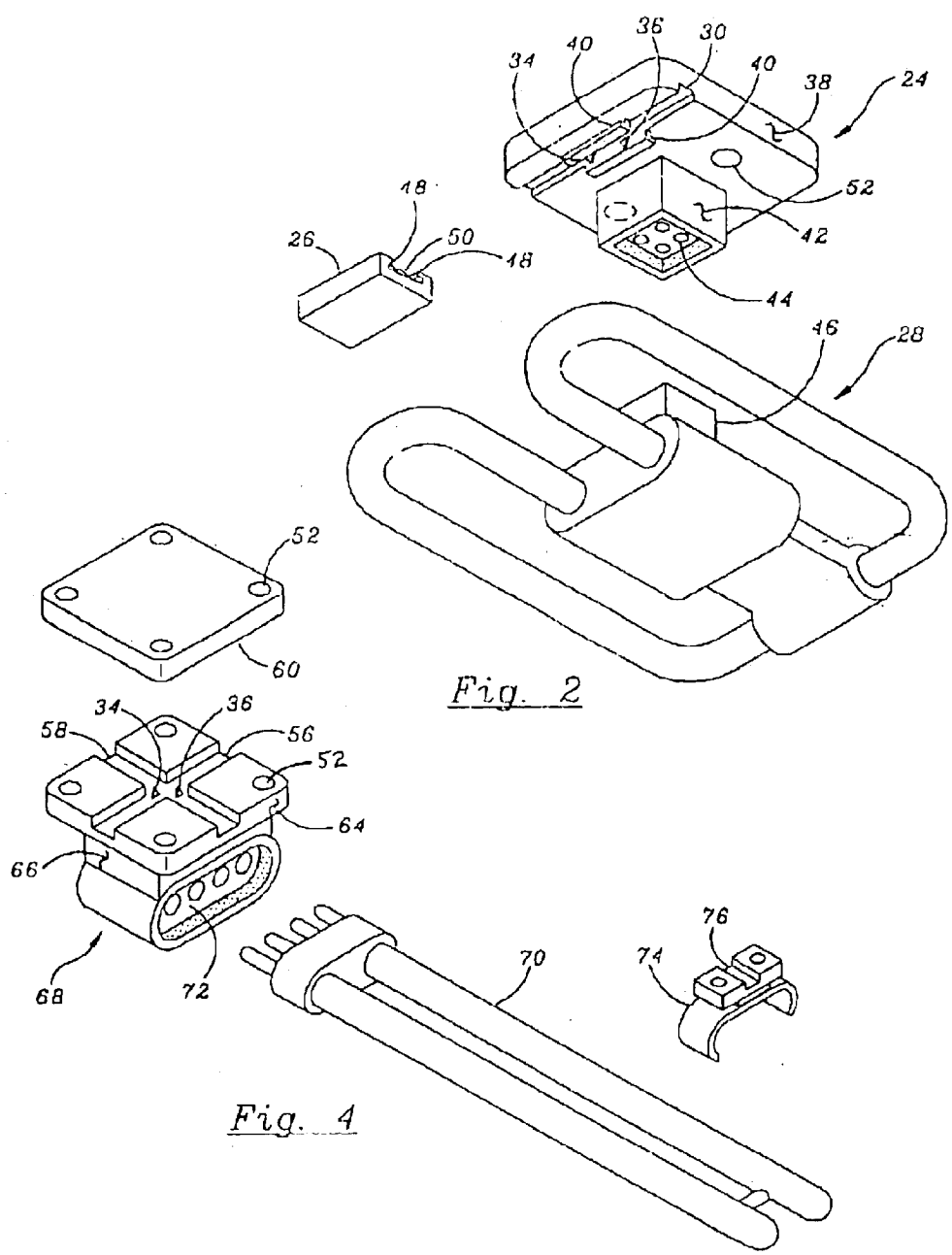
FIG. 2 shows a more detailed view of a high-frequency ballasted-socket assembly shown in FIG. 1.

FIG. 2 shows a more detailed view of the high-frequency ballasted-socket assembly 24 shown in FIG. 1. In the base 38 of the high-frequency ballasted-socket, assembly 24 is a recessed channel 30. The recessed channel 30 contains high-frequency input terminal #1 34 and high-frequency input terminal #2 36. The two high-frequency input terminals are located in opposite lanes within the recessed channel 30 and protrude approximately ¹⁄₁₆ to ⅛ of an inch above the bottom of the channel. Above the top surface of and on alternate side of the recessed channel 30 protrude a pair of base tabs 40. Extending down from the base 38 is a column 42, which along with the base 38 contains ballasting circuitry such as that shown in FIG. 5. The column 42 also includes a four-pin lamp socket 44. Incorporated into the four-pin lamp socket 44 are a pair of recesses (not shown), which are engaged by a pair of support tabs (also not shown) built into the base of the 2D lamp plug assembly 46 of the 2D lamp 28. A pair of screw holes 52 is provided on alternate side of column 42 through base 38. The slide-on cover 26 includes a pair of cover tabs 48 on alternate sides of the slide-on cover, which are designed to engage with the base tabs 40. In the center of the slide-on cover 26 is a center ridge 50. The center ridge 50 extends the length of the slide-on cover approximately ⅛ of an inch above the inside surface. Each end tapers down to being flush with the inside surface starting approximately ⅛ inch in from each end.

Figure 3:
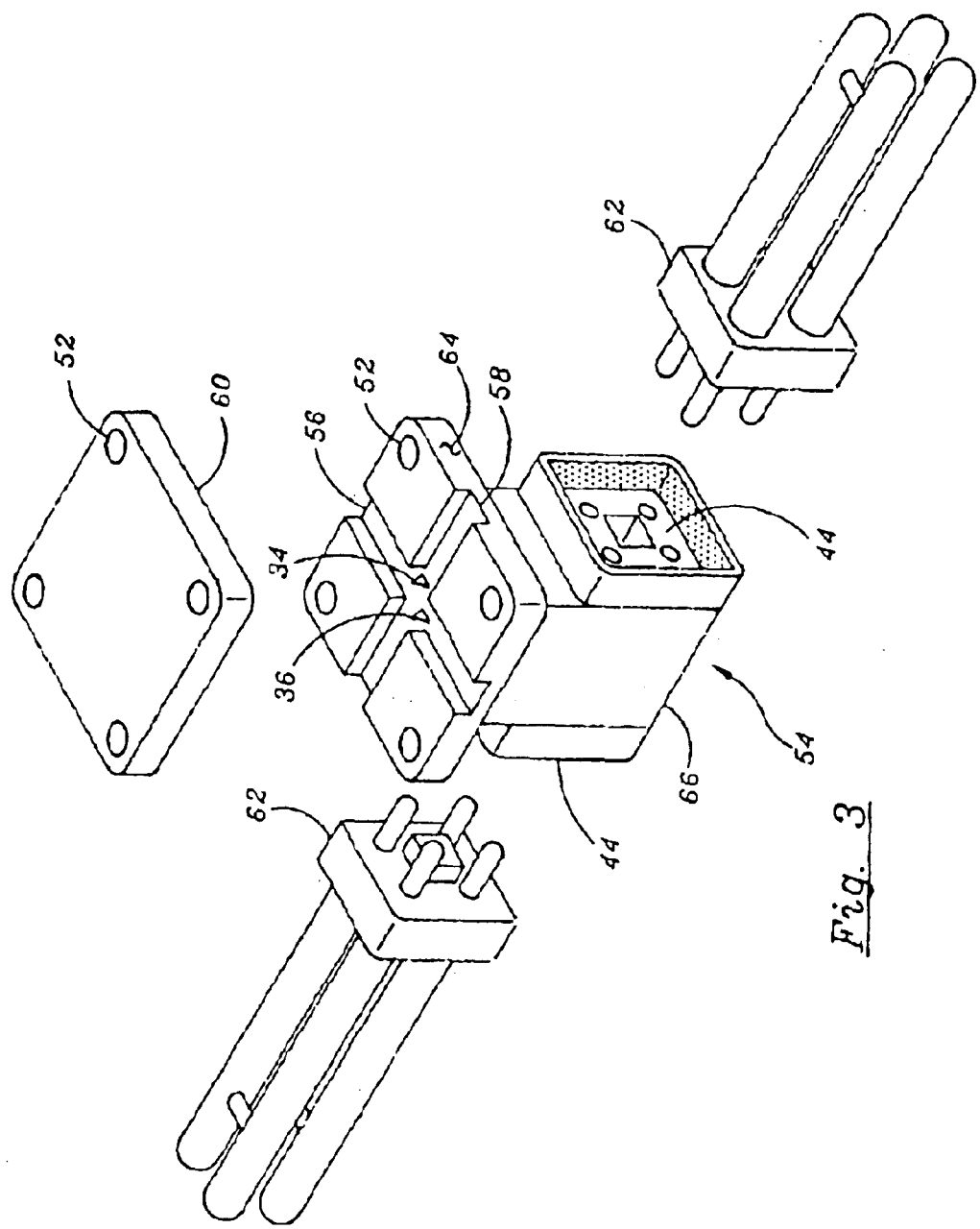
FIG. 3 shows a two-lamp ballasted-socket assembly for under-cabinet lighting using two double Biax lamps.

FIG. 3 shows a two-lamp ballasted-socket assembly 54 for under-cabinet lighting shown with two double Biax lamps 62. The mounting base 64 contains four screw holes 52 and a recessed channel A 56 and a recessed channel B 58 intersecting at right angles. In the area common to recessed channel A 56 and recessed channel B 58 are two conductive input terminals, high-frequency input terminal #1 34 and high-frequency input terminal #2 36. The terminals are offset from one another, such that, if the two intersecting channels are thought of as two lane highways each of the two terminals is in the opposite lane of each of the respective channels. The ballast housing 66 extends down from the mounting base 64 and encloses the high-frequency ballasting circuitry (not visible in this figure, but shown schematically in FIG. 6). Incorporated into the ballast housing are two four-pin lamp sockets 44. The four-pin lamp sockets 44 are capable of receiving and supporting a double Biax lamp 62. The base cover plate 60 contains four screw holes 52. It may be desirable to provide matching recesses in the base cover plate 60 to aid assembly.

FIG. 4 shows a Biax lamp ballasted-socket assembly 68 shown with a long Biax lamp 70. As in the previous example the mounting base 64 contains four screw holes 52 and a recessed channel A 56 and a recessed channel B 58 intersecting at right angles. In the area common to recessed channel A 56 and recessed channel B 58 are two conductive input terminals, high-frequency input terminal #1 34 and high-frequency input terminal #2 36. The terminals are offset from one another as described above. The ballast housing 66 extends down from the mounting base 64 and encloses the high-frequency ballasting circuitry (not visible in this figure, but shown schematically in FIG. 5). Incorporated into the ballast housing is a long Biax lamp socket 72. The Biax lamp socket 72 is capable of receiving and supporting one end of a Biax lamp 70. Due to the length and weight of a long Biax lamp, an additional support bracket 74 is required to hold the far end of the lamp in place. The support bracket 74 is provided with recess 76. The base cover plate 60 contains four screw holes 52.

Figure 5:
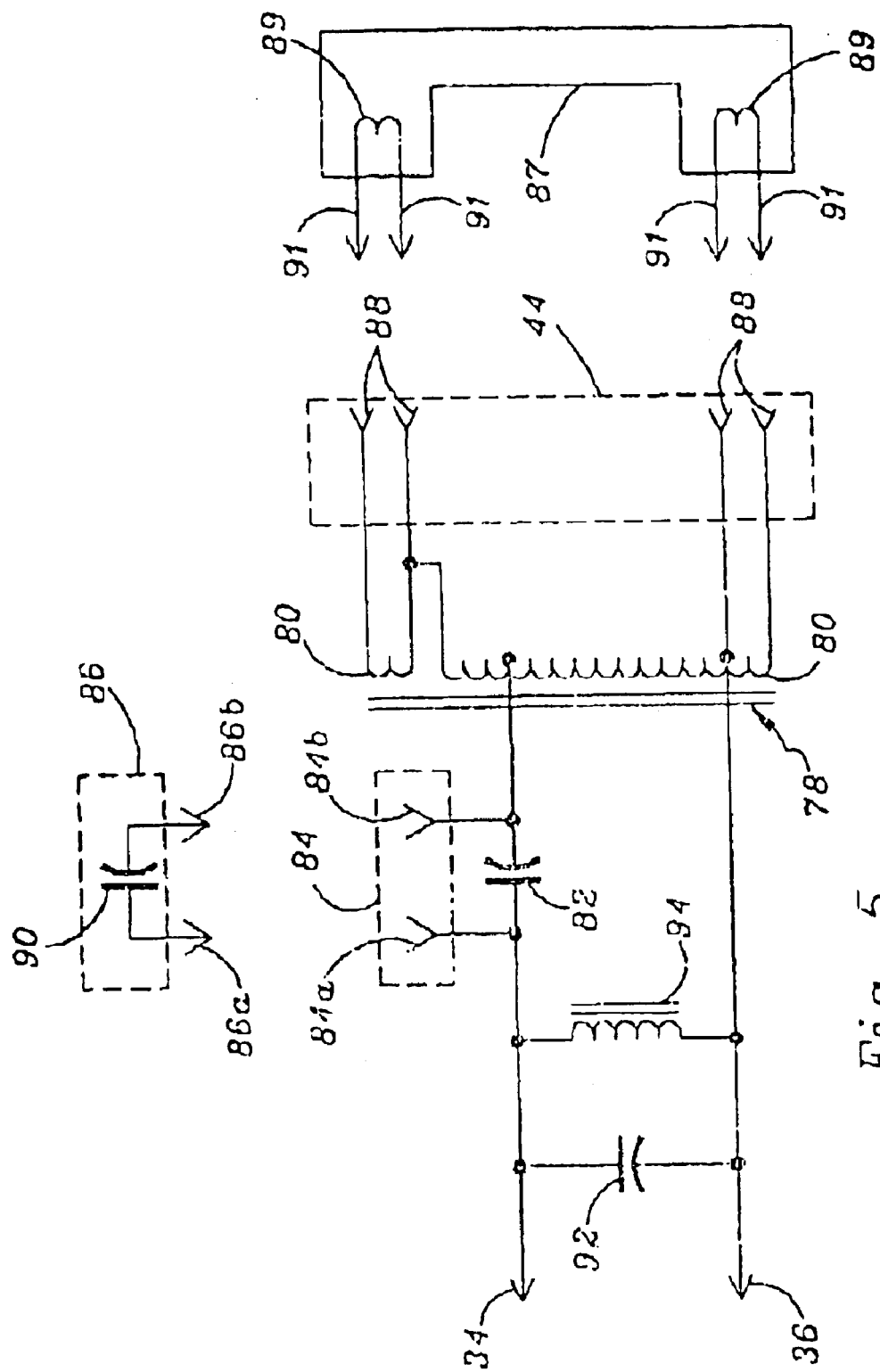
FIG. 5 schematically shows a typical one-lamp ballasted-socket assembly circuit.

FIG. 5 schematically shows a typical single-lamp ballasted-socket circuit for under-cabinet lighting. The high-frequency input terminal #1 34 and high-frequency input terminal #2 36 are provided for connection to high-frequency output cord 18 shown in FIG. 1. The output terminals 88 are part of the four-pin lamp socket 44 of FIG. 2 or long Biax lamp socket 72 of FIG. 4. The output terminals 88 provide voltage to heat lamp cathodes and current-limited voltage to provide lamp current. Transformer 78 is used to step-up or step-down the lamp starting voltage as required by the particular lamp to be used and to supply cathode voltage from the cathode windings 80. Primary ballasting capacitor 82 limits the current supplied to the lamp after lamp ignition. Tank capacitor 92 and tank inductor 94, in concert with the reflected load and primary ballasting capacitor 82, form a parallel resonant tuned circuit. Across primary ballast capacitor 82 may be connected an optional power level jack 84 with terminals 84a and 84b. Power level plug 86 is an insulated module containing power-increasing capacitor 90 and having two parallel-elongated terminals 86a and 86b projecting from it. Gas discharge lamp 87 has two cathodes 89. Each of the cathodes has one or more cathode terminals 91.

Figure 6:
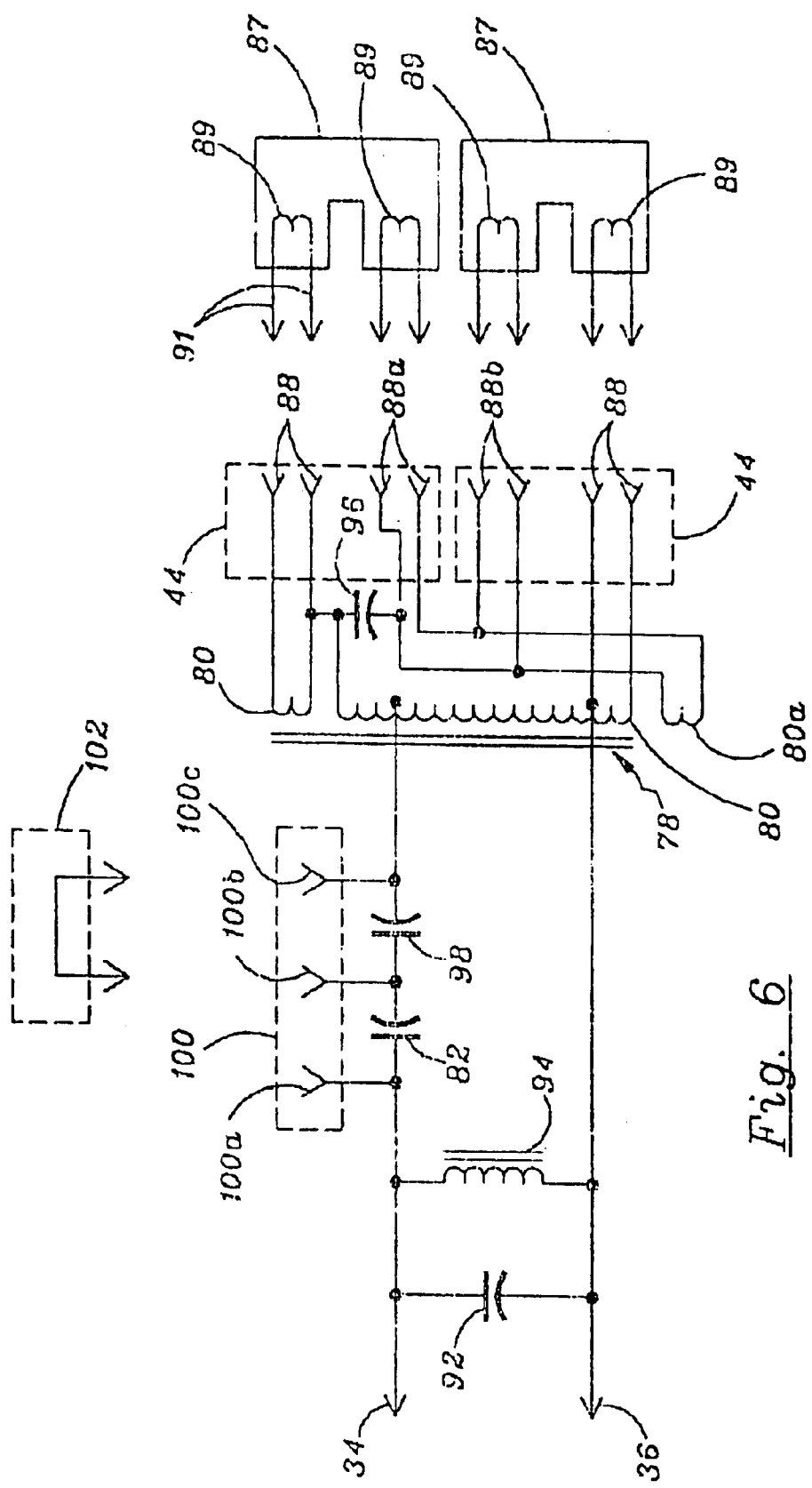
FIG. 6 schematically shows a typical two-lamp ballasted-socket assembly circuit.

FIG. 6 schematically shows a typical circuit for a ballasted-socket for two lamps as is shown in FIG. 3. The high-frequency input terminal #1 34 and high-frequency input terminal #2 36 are provided for connection to high-frequency output cord 18 shown in FIG. 1. The output terminals 88 are part of the two separate four-pin lamp sockets 44. The output terminals 88 provide voltage to heat lamp cathodes and current-limited voltage to provide lamp current. Transformer 78 is used to step-up or step-down the lamp starting voltage as required by the particular lamp to be used. Transformer 78 also supplies cathode voltage from the three cathode windings 80 and 80a. A starting aid capacitor 96 can be provided between the isolated cathode winding and one of the other cathode windings. Primary ballasting capacitor 82 limits the current supplied to the lamps after lamp ignition. Tank capacitor 92 and tank inductor 94, in concert with the reflected load and primary ballasting capacitor 82, form a parallel resonant tuned circuit. An optional supplemental ballasting capacitor 98 can be provided in series with the primary ballasting capacitor 82. If so provided, a three-terminal socket 100 is also provided as shown in the schematic. Terminal 100b is connected to the junction of primary ballasting capacitor 82 and supplemental ballasting capacitor 98. Socket terminal 100a is connected to the opposite end of primary ballasting capacitor 82 and socket terminal 100c is connected to the opposite end of supplemental capacitor 98. The socket terminal 100a is spaced the same distance from 100b as 100c is spaced from 100b. Power level jumper 102 is an insulated plug arrangement with two parallel-elongated terminals suitable for insertion into either socket terminals 100a and 100b or socket terminals 100b and 100c. The pair of gas discharge lamps 87 each has two cathodes 89. Each of the cathodes has one or more cathode terminals 91.

OPERATION

Preferred Embodiment

As shown in FIG. 1 the bottom 12 of kitchen wall cabinets 10 are actually located 1.5 to 2 inches above the bottom edge of the front, rear, and sides of the cabinet. This provides an ideal location to hide lighting to illuminate the kitchen counter top. Unfortunately, the side walls of the cabinets also extend below this bottom. To install lighting under these cabinets it becomes necessary to either cut out sections of the cabinet side panels 22 to create a means to interconnect the lighting fixtures or drill relatively large holes through these side panels to run conduit, BX, or to feed the connector of an interconnecting cord set through. The instant invention permits a much smaller hole to be used to provide wiring access between the individual wall cabinet bottoms for installing the under-cabinet lighting as well as eliminating plugs and or sockets on the luminaires as well as on the interconnecting cords.

Referring to FIG. 1, in the preferred embodiment, a high-frequency power supply 14 is plugged directly into a standard duplex wall outlet 16. The high-frequency output voltage is sinusoidal and may be any voltage up to approximately 150 Volts. Using a voltage of 150 volts has the advantage of minimizing the effect of contact resistance, and it also permits a smaller conductor to be used, but lower voltages could be used if shock hazard is a consideration. Access holes 20 are drilled through the cabinet side panels 22 as close to the wall cabinet bottom 12 as possible. These access holes 20 can be less than a quarter of an inch in diameter. The high-frequency output cord 18 is then fed through the access holes 20 to each wall cabinet bottom 12 requiring lighting. A high-frequency ballasted-socket assembly 24 is then mounted to the wall cabinet bottom 12, such that, the recessed channel 30 is in line with the high-frequency output cord. The high-frequency output cord 18 is placed into the recessed channel 30 of the high-frequency ballasted-socket assembly 24. The slide-on cover 26 slides over the recessed channel 30 forcing the high-frequency output cord 18 down into the recessed channel 30, and onto a pair of high-frequency input terminals 34 and 36 which are shown in more detail in FIG. 2. A gas discharge lamp, such as, a 2D lamp 28 is then inserted into the high-frequency ballasted-socket assembly 24.

To improve the overall efficacy of the lighting system an optional reflector 32 can be provided. The reflector can be as simple as a flat sheet of reflective plastic or metal, or a molded or fabricated piece including bends or ribs to improve rigidity and to attempt to focus and direct the light. In any case the reflector 32 can simply be mounted by placing it on the wall cabinet bottom 12, mounting the high-frequency ballasted-socket assembly beneath it, and then fastening the combination to the bottom of the wall cabinet bottom 12 with screws inserted through the screw holes 52 provided in both the high-frequency ballasted-socket assembly 24 and the reflector 32. Alternately the reflector 32 can be incorporated as part of the high-frequency ballasted-socket assembly 24. As a third alternate design the reflector 32 can include an aperture between the two screw holes 52 large enough to pass over the column 42 and be mounted between the lamp 28 and the high-frequency ballasted-socket assembly 24.

Although the high-frequency power supply 14 is shown as an assembly that is plugged directly into a duplex outlet 16, another design incorporates a line cord emanating from one side of an enclosure and the high frequency output cord emanating from another side. The enclosure is then mounted to the wall cabinet bottom 12. The lights may be turned on and off with a switch incorporated into the high-frequency power supply 14 or via a switch incorporated into the plug of the line cord.

FIG. 3 shows a two-lamp high-frequency ballasted-socket assembly 54. In the basic embodiment shown, the assembly is installed by first locating the base cover plate 60 on the wall cabinet bottom 12 (FIG. 1). The high-frequency output cord is then passed over the base cover plate. A decision is then made, depending on the application, as to whether the lamps should be oriented such that they are parallel to the high-frequency output cord 18 or perpendicular to it. The two-lamp high-frequency ballasted-socket assembly 54 is then placed over the high-frequency output cord 18, routing the cord through recessed channel A 56 or recessed channel B 58. Appropriate size screws are then inserted through the screw holes 52 of both the high-frequency ballasted-socket assembly 54 and base cover plate 60. As the screws are tightened down the high-frequency input terminals #1 and #2 (34 and 36) are forced into high-frequency output cord 18 (FIG. 1) and make electrical connection to the appropriate conductors within the cord. FIG. 3 shows a two-lamp high-frequency ballasted-socket assembly with double Biax lamps. This assembly can be configured to also operate as a single lamp high-frequency ballasted-socket assembly as well as be adapted to handle a variety of gas discharge lamp types.

FIG. 4 shows a Biax-lamp ballasted-socket assembly 68 with a long Biax lamp 70. Shorter varieties of gas discharge lamps, such as, compact fluorescent Biax types can be totally supported by the socket that they are plugged into. Due to the length of the long Biax category of lamps, the lamps cannot be cantilevered out from the socket, but require an additional support element to support the end of the lamp opposite the connector. The support bracket 74 is provided to accomplish this function. The installation of the Biax lamp ballasted-socket assembly is essentially the same as discussed previously regarding the high-frequency ballasted-socket assembly shown in FIG. 3 except the support bracket 74 must also be mounted. Here again the Biax-lamp ballasted-socket assembly 68 can be mounted in one of four possible orientations depending on the application. The lamp can be oriented parallel to the high-frequency output cord or perpendicular to it. If the lamp is oriented parallel to the cord, a recess 76 is provided in the support bracket 74 to allow the high-frequency output cord to pass through and act as a support for the cord.

FIG. 5 is typical of a circuit, which can be used in a ballasted-socket assembly for under-cabinet lighting. In a preferred embodiment, the circuit is designed to be powered from a class II or class III power-limited supply. As a result, the National Electrical Code does not require the interconnecting wires between the power supply and the ballasted-socket assembly to be run in conduit or BX even if the wiring is run within a wall, but permits much lighter weight non-armored cable to be used. In application where the wiring for the under-cabinet lighting is totally exposed (i.e., not run in the wall or behind a cabinet) there is no requirement for the source of power to be restricted to class II or class III source. In order to minimize the physical size of the electronic components used for the ballast circuitry (tank capacitor 92, tank inductor 94, ballasting capacitor 82, and transformer 78), operating at a frequency in the range of 18 kHz to 100 kHz is preferred. The cathode windings 80 provide voltage to heat the lamp cathodes for rapid start operation. Ballasting capacitor 82 is connected in series with transformer 78 to limit the current supplied through the gas discharge lamp 87 connected with the output terminals 88.

By placing the ballasting capacitor in series with the input side of the transformer 78, the voltage across the input to the transformer 78 is reduced after the gas discharge lamp is ignited and begins to draw current through the lamp, in addition to the current being drawn by the cathodes of the gas discharge lamp. This is due to the fact that a portion of the voltage supplied across the two high-frequency input terminals #1 and #2 (34 and 36) is dropped across the ballasting capacitor. As a result of the voltage being reduced to the input of the transformer, the voltage supplied across the cathodes of the gas discharge lamp is also reduced. This causes a reduction in the power dissipated in the cathodes during normal operation, which allows for increased efficiency of operation. By eliminating the cathode windings 80 and increasing the open circuit output voltage delivered across the lamp, instant start operation of the gas discharge lamp can also be achieved.

An optional power level jack 84 can be incorporated by connecting its' two terminals 84a and 84b on alternate ends of ballasting capacitor 82. A power level plug 86 containing power increasing capacitor 90 can be plugged into power level jack 84 on ballasted-socket assemblies where the light level of the gas discharge lamp needs to be increased. Placing the power increasing capacitor 90 in parallel with the ballasting capacitor 82 decreases the impedance in series with the input to the input of transformer 78, which results in an increased lamp current through the gas discharge lamp and an increase in light output. A variety of power level plugs with various values of power increasing capacitors 90 can be made available to provide numerous power levels. Since the power level can only be increased using this approach, the minimum power level is established by ballasting capacitor 82.

Tank capacitor 92 and tank inductor 94, in concert with the reflected load and primary ballasting capacitor 82, form a parallel resonant tuned circuit which is set-up to match the fundamental frequency of the high-frequency power supply. By tuning the ballasted-socket assembly in this manner, the power factor of the ballasted-socket assembly can be made to approach unity.

FIG. 6 is typical of a circuit, which can be used in a two-lamp ballasted-socket assembly for under-cabinet lighting. This circuit operates the same as the circuit in FIG. 5 except that an alternate approach is shown for selecting the power level and the circuit is set up for rapid start operation of two lamps in series. Two four-pin lamp sockets 44 are provided for connecting to two separate gas discharge lamps 87. An additional isolated cathode winding 80a provides cathode voltage to the two cathodes (one from each lamp) which end up being connected in parallel via output terminals 88a and 88b. Since the two lamps are connected in series, the same current flows through both lamps, except for the small current, which flows through the starting aid capacitor 96 connected in parallel with one of the lamps. The starting aid capacitor permits the pair of lamps to start with a voltage substantially less than twice that required to ignite a single lamp.

If power level selection is desired, a supplemental ballasting capacitor 98 is added in series with ballasting capacitor 82. A three-terminal socket 100 is connected across the two capacitors 82 and 98, such that, terminal 100b is connected to the junction of ballasting capacitor 82 and supplemental ballasting capacitor 98. Terminal 100a is connected to the other end of ballasting capacitor 82 and 100c is connected to the other end of supplemental ballasting capacitor 98. If the value ballasting capacitor 82 is chosen to provide the proper nominal light output from the gas discharge lamp and the value of supplemental ballasting capacitor 98 is chosen to be less than the value of ballasting capacitor 82, three levels of light are available. To set the light level at the nominal level the power level jumper is inserted between socket terminals 100b and 100c. A lower light level is selected by inserting the power level plug into terminals 100a and 100b. The lowest light level is selected by leaving the power level jumper out completely.

Alternately, if the value ballasting capacitor 82 is chosen to provide the proper nominal light output from the gas discharge lamp and the value of supplemental ballasting capacitor 98 is chosen to be greater than the value of ballasting capacitor 82, three levels of light are also available. To set the light level at the nominal level the power level jumper is again inserted between socket terminals 100b and 100c. A higher light level is selected by inserting the power level plug into socket terminals 100a and 100b. The lowest light level is selected by leaving the power level jumper out completely.

Since the power level selection is accomplished on the input to the transformer in both. FIG. 5 and FIG. 6, the cathode voltage is also affected by changing the power level of the lamps. Since lamp life can be adversely affected by reducing the cathode voltage excessively at the same time the lamp current is reduced for dimming, the range of dimming is somewhat limited unless the cathodes are provided with somewhat higher voltage for nominal operation.

This limitation can be eliminated by moving the power level selection circuitry and ballasting capacitor to their traditional location, which is in series with the output of the transformer instead of in series with the input to the transformer. This will eliminate the reduction of cathode voltage as a function of the lamp current level (dimming) and permit a much greater dimming range without adversely affecting the life of the lamps.

CONCLUSIONS, RAMIFICATIONS, AND SCOPE

Accordingly, it can be seen that the invention provides a dramatic reduction in the cost to manufacture, ship and store luminaires. In addition, substantial savings in the cost of installation are achieved since the luminaires can easily be assembled, installed and connected to the power source by non-skilled, non-electrician installers.

Although the description above contains many specificities, these should not be construed as limiting the scope of the invention but as merely providing illustrations of some of the presently preferred embodiments of this invention. Various other embodiments and ramifications are possible within it's scope. For example, although the preferred embodiment describes the Under-cabinet Lighting System with a ballasted-socket designed for a class II or class III high-frequency power input, the Under-cabinet Lighting System concept can also be used with non-class I or III, AC and DC circuits. The ballasted-socket in these situations would merely have to enclose all non-class II and III circuits and wiring, while the input connection would have to meet the local codes that may apply. In the preferred embodiment, the enclosure of the ballasted-socket assemblies are constructed out of non-conductive material, which eliminates the need to carry a ground wire in the interconnecting cord, but they could also be made out of conductive material if the exposed conductive material is grounded.

Thus, the scope of the invention should be determined by the appended claims and their legal equivalents, rather than by the examples given.

DEFINITIONS luminaire: a complete lighting unit consisting of a lamp or lamps together with the parts designed to distribute the light, to position and protect the lamps, and to connect and interface the lamps to the power source.

compact fluorescent lamps: single-ended fluorescent lamps such as, Biax, double Biax, triple Biax, quad Biax, long Biax, flat, helical, spring, etc.

high-frequency: frequencies greater than 10 kHz.

insulation displacement connection: an electrical connection technique in which an insulated wire is inserted into an opening of a connector. A metal terminal is forced through the insulation thus displacing the insulation and forming an electrical connection between the terminal and the conductor.

I claim:

1. A luminaire suitable for connection to and being powered from a high-frequency power source;

the luminaire having a ballasted socket assembly;

said ballasted socket assembly having a high-frequency input terminal #1, a high-frequency input terminal #2, a ballasting circuit, a lamp socket, interconnecting wiring, and an enclosure;

said enclosure completely enclosing the ballasting circuit, and the interconnecting wiring;

said ballasted socket assembly also provided with a channel;

the high-frequency input terminals being located within said channel;

the channel being of such a design as to receive and connect to a high-frequency cord comprising two parallel conductors encased within and separated from each other by a common insulating sheath;

the high-frequency input terminal #1 making connection to one of the two parallel conductors;

the high-frequency input terminal #2 making connection to the second of the two parallel conductors.

2. The ballasted socket assembly described in claim 1, wherein said ballasted socket assembly is provided with a base for mounting;

said base having a recessed channel;

said recessed channel being accessible after the ballasted socket assembly is mounted in place; and said ballasted socket assembly being adapted to be mounted in place prior to being connected to the high-frequency output cord.

3. The luminaire described in claim 1, wherein said ballasted socket assembly is provided with a mounting base;

said mounting base having a recessed channel;

said recessed channel adapted for receiving the high-frequency output cord; and said ballasted socket assembly being adapted to be mounted in place after receiving the high-frequency output cord.

4. The luminaire described in claim 1, wherein the ballasted socket assembly is provided with a socket capable of receiving and supporting a single-ended lamp having an overall length greater than 6 inches and less than 25 inches;

said luminaire requiring a support bracket to properly support said single-ended lamp;

said support bracket being provided as an integral part of the ballasted socket assembly.

5. The luminaire described in claim 1, wherein the ballasted socket assembly includes two lamp sockets;

the lamp sockets each having a receptacle capable of receiving a single-ended lamp;

said single-ended lamp being a gas-discharge lamp;

said receptacles facing opposing directions and located on substantially the same axis.

6. The luminaire described in claim 1, wherein the ballasted socket assembly is adapted to power a single-ended fluorescent lamp.

7. The luminaire described in claim 1, wherein the ballasted socket assembly is provided with a socket capable of receiving and supporting a single-ended lamp having an overall length greater than 6 inches and less than 25 inches;

said luminaire requiring a support bracket to properly support said single-ended lamp;

said support bracket being provided as a separate piece;

said support bracket mounted to the bottom of the shelf or cabinet at the time of installation at a point along the length of the long single-ended lamp;

said support bracket being provided with a recess capable of allowing said interconnecting cord to pass through.

8. A method of providing under-cabinet lighting, comprising the steps of:

a. mounting one or more ballasted socket assemblies to the under side of a cabinet or a shelf, b. passing a high-frequency output cord through each ballasted socket assemblies' recessed channel, c. positioning a slide-on cover such that the cover tabs of the slide-on cover engage with a set of base tabs, d. sliding the slide-on cover forward, e. forcing the high-frequency input terminals to pierce the insulation of the high-frequency output cord and make electrical contact with an internal conductor.

9. The process described in claim 8, additionally characterized by including the step of inserting a gas-discharge lamp into the ballasted socket assembly.

10. The process described in claim 8, additionally characterized by including the step of inserting a single-ended fluorescent lamp into the ballasted socket assembly.

11. The process described in claim 8, whereby the ballasted socket assembly includes a socket with an opening suitable for receiving a gas-discharge lamp;

the opening positioned on the ballasted socket assembly such that when the ballasted socket assembly is mounted beneath a cabinet or shelf the opening is facing in a downward position.

12. The process described in claim 8, whereby the ballasted socket assembly includes a socket with an opening suitable for receiving a gas-discharge lamp;

the opening positioned on the ballasted socket assembly such that when the ballasted socket assembly is mounted beneath a cabinet or shelf the opening is facing to a side.

13. The process described in claim 8, whereby the ballasted socket assembly includes two sockets each having an opening suitable for receiving a gas-discharge lamp;

the opening positioned on the ballasted socket assembly such that when the ballasted socket assembly is mounted beneath a cabinet or shelf, the openings are facing opposite sides and neither socket is facing in a downward direction.

14. A method of providing lighting system, comprising the steps of:

a. mounting one or more ballasted socket assemblies, b. passing a high-frequency output cord through the recessed channel of each ballasted socket assembly, c. actuating a mechanism that will force the conductors of a high-frequency output cord to make electrical contact with the input terminals of the ballasted socket assembly, d. inserting a gas-discharge lamp into the ballasted socket assembly.

15. A ballasted socket assembly for installation under a cabinet or shelf;

said ballasted socket assembly including a pair of high-frequency input terminals, a high-frequency ballasting circuit, a lamp socket for a single-ended lamp, interconnecting wiring between the high-frequency input terminals and the high-frequency ballasting circuit, interconnecting wiring between the high-frequency ballasting circuit and the lamp socket for a single-ended lamp, and an enclosure;

said enclosure completely enclosing the high-frequency ballasting circuitry, the interconnecting wiring between the high-frequency input terminals and the high-frequency ballasting circuit, and the interconnecting wiring between the high-frequency ballasting circuit and the lamp socket for a single-ended lamp;

the term high-frequency referring to a frequency greater than 10 kilohertz;

said enclosure not enclosing a single-ended lamp;

an optional reflector being used with the ballasted socket assembly;

said reflector being installed between the ballasted socket assembly and the underside of the cabinet or shelf; and a lamp being inserted into the ballasted socket assembly whereby said lamp and said ballasted socket assembly are located on the same side of the reflector.

16. An arrangement comprising: a pair of input terminals, a ballasting circuit, a socket with output terminals that is capable of receiving, supporting and making electrical connection to a single-ended lamp, interconnecting wiring between the input terminals and the ballasting circuitry, interconnecting wiring between the ballasting circuitry and the output terminals of the socket and an enclosure;

the input to the ballasting circuit being connected to the pair of input terminals;

the output of the ballasting circuit being connected to the output terminals within the socket;

the ballasting circuit being capable of properly igniting and powering a gas discharge lamp when provided with a high-frequency voltage on the pair of input terminals;

the enclosure completely encapsulating the ballasting circuitry, the interconnecting wiring between the input terminals and the ballasting circuitry, the interconnecting wiring between the ballasting circuitry and the output terminals of the socket, and the portion of the output terminals to which the ballasting circuitry connects;

said enclosure not enclosing a single-ended lamp;

said pair of input terminals makes connection to a source of high-frequency voltage by way of an insulation displacement connector;

an insulation-displacement connector being a connector capable of making an insulation-displacement type connection; and said arrangement being further characterized in that the arrangement is provided with a single insulation-displacement connector.

17. An arrangement comprising: a pair of input terminals, a ballasting circuit, a socket with output terminals that is capable of receiving, supporting and making electrical connection to a single-ended lamp, interconnecting wiring between the input terminals and the ballasting circuitry, interconnecting wiring between the ballasting circuitry and the output terminals of the socket and an enclosure;

the input to the ballasting circuit being connected to the pair of input terminals;

the output of the ballasting circuit being connected to the output terminals within the socket;

the ballasting circuit being capable of properly igniting and powering a gas discharge lamp when provided with a high-frequency voltage on the pair of input terminals;

the enclosure completely encapsulating the ballasting circuitry, the interconnecting wiring between the input terminals and the ballasting circuitry, the interconnecting wiring between the ballasting circuitry and the output terminals of the socket, and the portion of the output terminals to which the ballasting circuitry connects;

said enclosure not enclosing a single-ended lamp;

said arrangement being provided with a mounting base;

said mounting base including two recessed channels oriented at right angles with respect to each other;

said mounting base also including two high-frequency input terminals positioned at the intersection of the two channels;

said high-frequency input terminals being suitable for making an insulation displacement connection to a high-frequency output cord; and the arrangement being designed so that the mounting base will make proper connection to the high-frequency output cord in any one of four possible orientations.

18. A method of providing under-cabinet lighting, comprising the steps of: passing a high-frequency output cord along the bottom of a cabinet or a shelf, placing a ballasted socket assembly over the high-frequency output cord, mounting the ballasted socket assemblies to the under side of the cabinet or shelf;

the ballasted socket assembly including a socket with an opening suitable for receiving a gas-discharge lamp; and the opening positioned on the ballasted socket assembly such that when the ballasted socket assembly is mounted beneath a cabinet or shelf the opening is facing to a side.

19. A method of providing under-cabinet lighting, comprising the steps of:

passing a high-frequency output cord along the bottom of a cabinet or a shelf, placing a ballasted socket assembly over the high-frequency output cord, mounting the ballasted socket assemblies to the under side of the cabinet or shelf;

the ballasted socket assembly including two sockets each having an opening suitable for receiving a gas-discharge lamp; and the opening positioned on the ballasted socket assembly such that when the ballasted socket assembly is mounted beneath a cabinet or shelf, the openings are facing opposite sides and neither socket is facing in a downward direction.

* * * * *